United States Patent
Shirai et al.

(10) Patent No.: US 7,020,948 B2
(45) Date of Patent: Apr. 4, 2006

(54) METHOD FOR ASSEMBLING A STACKED CORE

(75) Inventors: Kuniyasu Shirai, Bisai (JP); Takuya Sato, Miyota-machi (JP)

(73) Assignees: Yamada Dobby Co., Ltd., Aichi (JP); Minebea Co., Ltd., Nagano (JP)

( * ) Notice: Subject to any disclaimer, the term of this patent is extended or adjusted under 35 U.S.C. 154(b) by 101 days.

(21) Appl. No.: 10/344,527

(22) PCT Filed: Jun. 11, 2002

(86) PCT No.: PCT/JP02/05740

§ 371 (c)(1),
(2), (4) Date: Feb. 12, 2003

(87) PCT Pub. No.: WO02/103726

PCT Pub. Date: Dec. 27, 2002

(65) Prior Publication Data

US 2003/0172519 A1 Sep. 18, 2003

(30) Foreign Application Priority Data

Jun. 13, 2001 (JP) .............................. 2001-178657

(51) Int. Cl.
*H02K 15/00* (2006.01)
*H02K 15/14* (2006.01)
*H02K 15/16* (2006.01)

(52) U.S. Cl. ...................... 29/596; 29/407.1; 29/564.6; 29/593; 29/598; 29/604; 29/607; 29/609; 29/732; 29/738; 29/880.022; 83/23; 83/109; 310/216; 310/217

(58) Field of Classification Search .................. 29/596, 29/564.6, 593, 598, 604, 607, 609, 732, 738, 29/407.1, 880.022; 310/216, 217; 83/23, 83/109
See application file for complete search history.

(56) References Cited

U.S. PATENT DOCUMENTS 4,649,611 A * 3/1987 Ikeda et al. ............ 29/888.022

(Continued)

FOREIGN PATENT DOCUMENTS

JP 60-099437 A1 6/1985
JP 03-174927 A1 7/1991

OTHER PUBLICATIONS

Office Action issued by Singapore Patent Office on Jul. 27, 2004.

(Continued)

*Primary Examiner*—A. Dexter Tugbang
*Assistant Examiner*—Tim Phan
(74) *Attorney, Agent, or Firm*—Rader, Fishman & Grauer

(57) ABSTRACT

The stacked core assembly apparatus, which can perform assembly at a high speed while keeping strength of an angle indexing apparatus, comprises a press machine 1, a non-synchronous transmitting apparatus 10 and an angle indexing apparatus 7. The non-synchronous transmitting apparatus 10 transforms a constant revolution of the press machine 1 into a variable revolution. The angle indexing apparatus 7 is connected to the non-synchronous transmitting apparatus 10 via a coupling device 20, and is connected to a rotatably stacking cavity device 51 of a press die 5. An accelerated rotational speed period of an output shaft 13 of the non-synchronous transmitting apparatus 10 is set during a Feeding-Phase period of time of the press machine 1, and thereby, a rotational state completion of a driving shaft 33 of the angle indexing apparatus 7 completes earlier than the Feeding-Phase period of time completion of the press machined 1 so that a non-rotating period of time can be provided as to settle pivoting motion of stacking cavity device prior to a Machining-phase period starts.

2 Claims, 6 Drawing Sheets

U.S. PATENT DOCUMENTS

| | | | |
|---|---|---|---|
| 4,723,360 A | | 2/1988 | Endo |
| 5,163,217 A | | 11/1992 | Sakanishi |
| 5,373,622 A | * | 12/1994 | Neuenschwander ........... 29/596 |
| 5,604,678 A | * | 2/1997 | Neuenschwander ......... 700/206 |
| 5,799,387 A | * | 9/1998 | Neuenschwander et al. .. 29/598 |
| 5,845,553 A | * | 12/1998 | Kooken et al. ................ 83/23 |
| 5,881,450 A | * | 3/1999 | Neuenschwander .......... 29/609 |
| 5,960,533 A | | 10/1999 | Neuenschwander |
| 6,192,575 B1 | | 2/2001 | Neuenschwander |

OTHER PUBLICATIONS

International Search Report of PCT/JP02/05740 mailed on Oct. 8, 2002.

European Search Report, Application No.: 027334443.2-2208 PCT/JP0205740, dated Oct. 7, 2005.

* cited by examiner

METHOD FOR ASSEMBLING A STACKED CORE

CROSS REFERENCE TO RELATED DOCUMENT

This application is a 371 filing of PCT/JP02/05740 filed on Jun. 11, 2002, which claims the benefit of Japanese Patent Application No. 2001-178657, filed on Jun. 13, 2001.

TECHNICAL FIELD

The present invention relates to a stacked core assembly method and its apparatus, which stacks a thin-strip material while forwardly feeding it, and more particularly, to a stacked core assembly method and its apparatus, in which a stacked member is rotatable in a die in a stacked cavity.

BACKGROUND ART

In general, a stacked core, for example, a motor stacked core is formed in the following manner. A thin-strip material intermittent carried into a press die by a feeder, by means of the thin-strip material intermittent proceeding through a plurality of pressing and/or punching process cavities of the press die, mounted to a press machine. A thin-sheet plate is then constantly intermittent stacked to a prior stacked member immediately after being punched out from the thin-strip material as a sheet of plate, pressed and interlocked to the prior stacked member in the stacking cavity of the press die. Since a thickness of the each punched out thin-sheet of plate vary within itself, due to prior pressing and/or punching processes, as a conventional method, rotate in a predetermined angle a stacking cavity device, a block having the stacking cavity and rotates in the press die. The thin-sheet of plate is interlocked to the prior stacked member with pressure. Thereafter, a thickness of the stacked core is within a predetermined thickness. An equipment of angle indexing apparatus for driving the stacking cavity device in the predetermined angle is set to the press machine, which is driven by continuous rotational power, transmitted from the driving unit of the press machine.

The angle indexing apparatus is driven for rotating the stacking cavity device during a Feeding-Phase period of time (by means of a Crank Angle from 270° to 360° and 0° (360°) to 90°) of the press machine as well as the thin-strip material is carried to next pressing and/or punching process cavity. When the angle indexing apparatus completes rotating the stacking cavity device (by means of the Crank Angle at 90° of the press machine), the press machine starts its Machining-Phase and runs in to a Machining-Phase period of time (by means of the Crank Angle from 90° to 180° and 180° to 270°) of the press machine. During the Machining-Phase period of time, neither the angle indexing apparatus drives stacking cavity device nor it's the thin-strip material carried to next process cavity. Thereafter, the thin-strip material at each cavity is pressed/punched and at the stacking cavity, a thin-sheet of plate is punched out from the thin-strip material, pressed and interlocked to the prior stacked member.

The angle indexing apparatus is set as to rotate at in the Feeding-Phase period of the press machine, includes a cam unit having a cam driven by an input shaft, and an indexing unit having an output shaft and a plurality of cam rollers contacted to the cam unit. By the pivoting cam rollers which rotate by the cam unit, in a predetermined angle, and thereby, the output shaft is rotated in the predetermined angle so that the angle indexing apparatus drive the stacking cavity device.

In a conventional stacking core apparatus, an input shaft of an angle indexing apparatus is connected to a driving unit of a press machine by a transmission member. Thus, the input shaft of the angle indexing apparatus continuously rotates at a constant rotational speed, synchronized to a constant rotational speed of the driving unit of the press machine. Hence the output shaft of the angle indexing apparatus has been equally intermittent driven synchronized to the Feeding-Phase period of the press machine, by means of the output shaft of the angle indexing apparatus rotates in the predetermined angle during the Feed-Phase period of time (i.e.; Crank the Angle from 270° to 360° and 0° (360°) to 90°) of the press machine, and is in a non-rotational state during a Machining-Phase period of time (i.e.; the Crank Angle from 90° to 180° and 180° to 270°) of the press machine.

In the above conventional stacking core apparatus, the rotation of the output shaft of the angle indexing apparatus stops rotating when the Feed-Phase period of time completes (i.e.; at the Crank Angle of 90°) at the same time, as well as in the same time the Machining-Phase period of time starts. That is, when the Machining-Phase period of time starts, each pilot protrusion arranged at an upper portion of the press die immediately jump into pilot protrusion guide holes respectably to predetermined guide holes arranged in each cavity device, when the stacked member is rotated and rotation is stopped. However, in an event of the press machine is operated at a high-speed, when the Feeding-Phase period of press machine completes and in the same time the Machining-Phase of period of the press machine starts, the pilot protrusions immediately jump into their pilot guide holes, but the stacking cavity device is still in pivoting motion and is not in a settlement state. When arc of pivoting pilot guide holes vary since the stacking cavity device is still in pivoting motion, when pilot protrusions jump into other than pilot guide holes, pilot protrusions are broken and/or damaged. For this reason, a high-speed operation can not be achieved.

An example of conventional method in order to achieve the high-speed operation, is to set the angle indexing apparatus output shaft rotational less than an angle of 180° (e.g., 150°, 120°, etc.) in respect to the input shaft rotation an angle of 180°, in order to obtain a time to attenuate the pivoting motion when the rotation is stopped. However, this additional mechanical structure change leads to a reduction of strength of the angle indexing apparatus and also to its transmitting rotational torque to the stacking cavity device, and thus it is impossible to achieve a high-speed operation.

DISCLOSURE OF THE INVENTION

The present invention has been proposed in order to solve the above problem. Accordingly, it is an object of the present invention to provide a stacked core assembly method and its apparatus, which can achieve a high-speed operation in a state of keeping strength of an angle indexing apparatus.

The first stacked core assembly method according to the present invention is a stacked core assembly method, which performs stacking in a manner of sequentially rotating a stacking cavity device when assembling a stacked member, characterized in that, in the stacking process, an angle indexing apparatus for rotating the stacking cavity device is arranged, and an output driving shaft of the angle indexing apparatus is provided with a non-rotating state period of time after a rotating state period of time completion and before a Feeding-Phase period of time completion, within the predetermined Feeding-Phase period of time range.

Therefore, according to the stacked core assembly method of the present invention, as described above, the angle indexing apparatus rotates the stacking cavity device at a predetermined angle, and thereafter, the non-rotational period of time is set until the Feeding-Phase period on the time completes. As a result, the pivoting motion of the stacking cavity device is settled during the non-rotational period of time, and in the case where each pilot protrusions punch arranged at an upper portion of the press die jump into pilot protrusion guide holes respectably to predetermined guide holes arranged in the stacking cavity device, so that the pilot protrusion punch has no interference and collision with other portions of the stacked member. Therefore, it is possible to achieve a high-speed operation.

And in the second stacked core assembly method of the present invention, the non-rotational state period of time is set by driving the output driving shaft of the angle indexing apparatus in an accelerated rotational speed during a predetermined Feed-Phase period of time, it is possible to offset the pivoting motion of the stacked core without reducing the strength of the angle indexing apparatus itself.

Further, according to a stacked core assembly apparatus, there is provided a stacked core assembly apparatus, which comprises a press machine, a feeder for feeding a thin-strip material into the press machine, and an angle indexing apparatus outputting an intermittent rotation when a driven from the press machine is transmitted thereto, and a stacking member or stacked core is formed in an intermittent rotational stacking cavity device, whereas driven by the angle indexing apparatus intermittently and the angle indexing device is driven by a constant rotational speed of a driving unit of the press machine, characterized in that, the angle indexing apparatus is connected to the driving unit of the press machine via a non-synchronous transmitting apparatus, and an output shaft of the non-synchronous transmitting apparatus has a variable rotating speed period of time with respect to an input shaft of the non-synchronous transmitting apparatus, and thereby, a non-rotating state period of time is provided after a rotating state period of time completion and before a Feeding-Phase period of time completion, within the predetermined Feeding-Phase period of time range.

Therefore, according to the stacked core assembly apparatus of the present invention, in order to secure the non-rotating state period on the output shaft of the angle indexing apparatus, a non-synchronous transmitting apparatus is installed, when the constant rotational speed is transmitted to the input shaft of the non-synchronous transmitting apparatus from the driving unit of the press machine. In order for the stacking cavity device to complete the rotation in advance to the Feeding-Phase period of the press machine completes, a non-synchronous mechanism transform and transmit the output shaft of the non-synchronous apparatus a variable rotational speed. Hence the input shaft of the angle indexing apparatus rotates at variable speed and thus, stacking cavity device rotates in an accelerated manner and its rotating period time is shorter than the Feeding-Phase period of time of the press machine. As a result, the angle indexing apparatus has the non-rotation period of time until the Feeding-Phase period is completed after the rotation of the angle indexing apparatus on the completes. In the case where each pilot protrusions punch arranged at an upper portion of the press die jump into pilot protrusion guide holes respectably to predetermined guide holes arranged in the stacking cavity device, so that the pilot protrusion punch has no interference and collision with other portions of the stacked member. Therefore, it is possible to achieve a high-speed operation.

According to the fourth stacked core assembly apparatus, the input and output shafts of the non-synchronous transmitting apparatus are arranged in an eccentric position, and are connected by a connecting lever, which is rotatably supported by pins eccentrically positioned with respect to each of rotational axis of the input shaft and that of the output shaft.

Therefore, in the non-synchronous transmitting apparatus, when the input shaft (rotary shaft of the press machine side) is rotated, the rotation output is transmitted to the output shaft (rotary shaft of the angle indexing apparatus side) positioned eccentrically with the input shaft by the connecting lever. Therefore, the constant rotational speed of the input shaft is transmitted as the variable rotational speed of the output shaft. In other words, the angle indexing apparatus connected to the output shaft of the non-synchronous transmitting apparatus has an advanced rotating state period with respect to the Feeding-Phase period of the press machine. Thus, the non-rotating state period of time is set prior to the Machining-Phase period of the press machine starts, and thereby, pivoting motion of the stacking cavity device is settled prior to the Machining-phase period of time starts. Therefore, the non-rotating period of time is provided without making small the index angle of the angle indexing apparatus, the angle indexing apparatus can be configured without reducing the strength of the angle indexing apparatus itself.

BEST MODE FOR CARRYING OUT THE INVENTION

Figure 1:
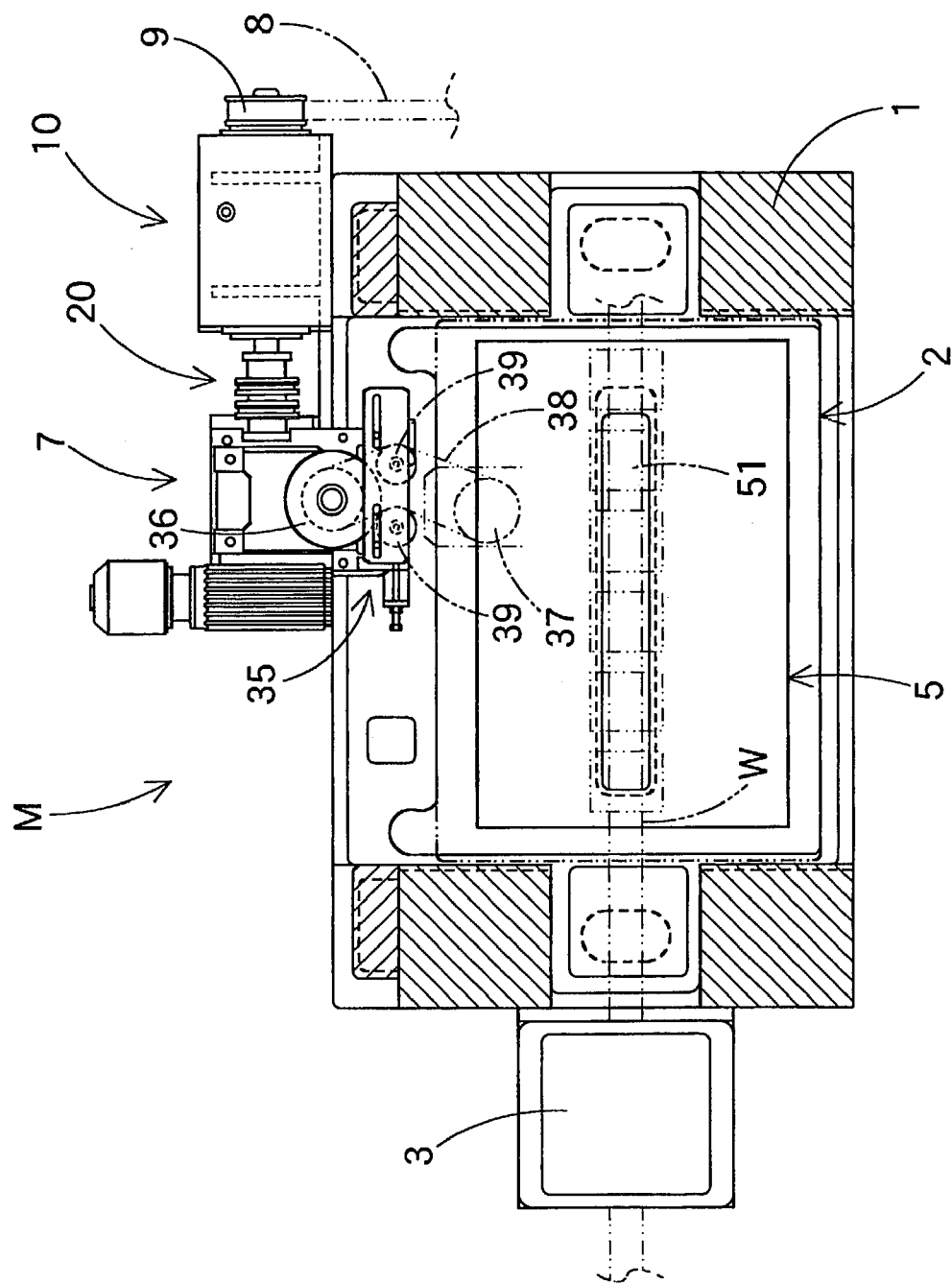
FIG. 1 is a top view depicting an assembly apparatus according to an embodiment of the present invention.

The following description of an embodiment of the present invention is made with reference to FIG. 1–FIG. 7. In these drawings, as shown in FIG. 1, a stacked core assembly apparatus (hereinafter, referred to as assembly apparatus) M comprises a press machine 1 used as assembly apparatus, a feeder 3, a press die 5, an angle indexing apparatus 7, and a non-synchronous transmitting apparatus 10. The feeder 3 feeds a thin-strip material W to the press machine 1, and the press die 5 is mounted on a bolster plate 2 of the press machine. Further, the angle indexing apparatus 7 is connected to a stacking cavity device 51 in the press die 5 when receiving a drive from the press machine 1, and thereafter, is driven. The non-synchronous transmitting apparatus 10 is interposed between the angle indexing apparatus 7 and a driving section of the press machine 1. The thin-strip material W is fed into the press machine 1 by the feeder 3, and then, is equally intermittent pressed/punched in each cavity of the press die 5 mounted in the press machine 1. Thereafter, a thin-sheet of plate is punched out from the thin-strip of material, pressed and interlocked to a prior stacked member, in the stacking cavity device 51 as to form a stacked core. The stacking cavity device 51 rotates at a predetermined angle every time one thin-sheet of plate is stacked at the stacking cavity device 51.

The press die 5 mounted on the bolster plate 2 of the press machine 1 is formed with each cavity device and assembled into a die chassis for equally intermittent press/punch the strip material W thus fed. The stacking cavity device 51 for punching out the thin plate from the thin-strip material W and stacking to the prior stacked member is arranged as a final cavity device in the press die 5.

Figure 2:
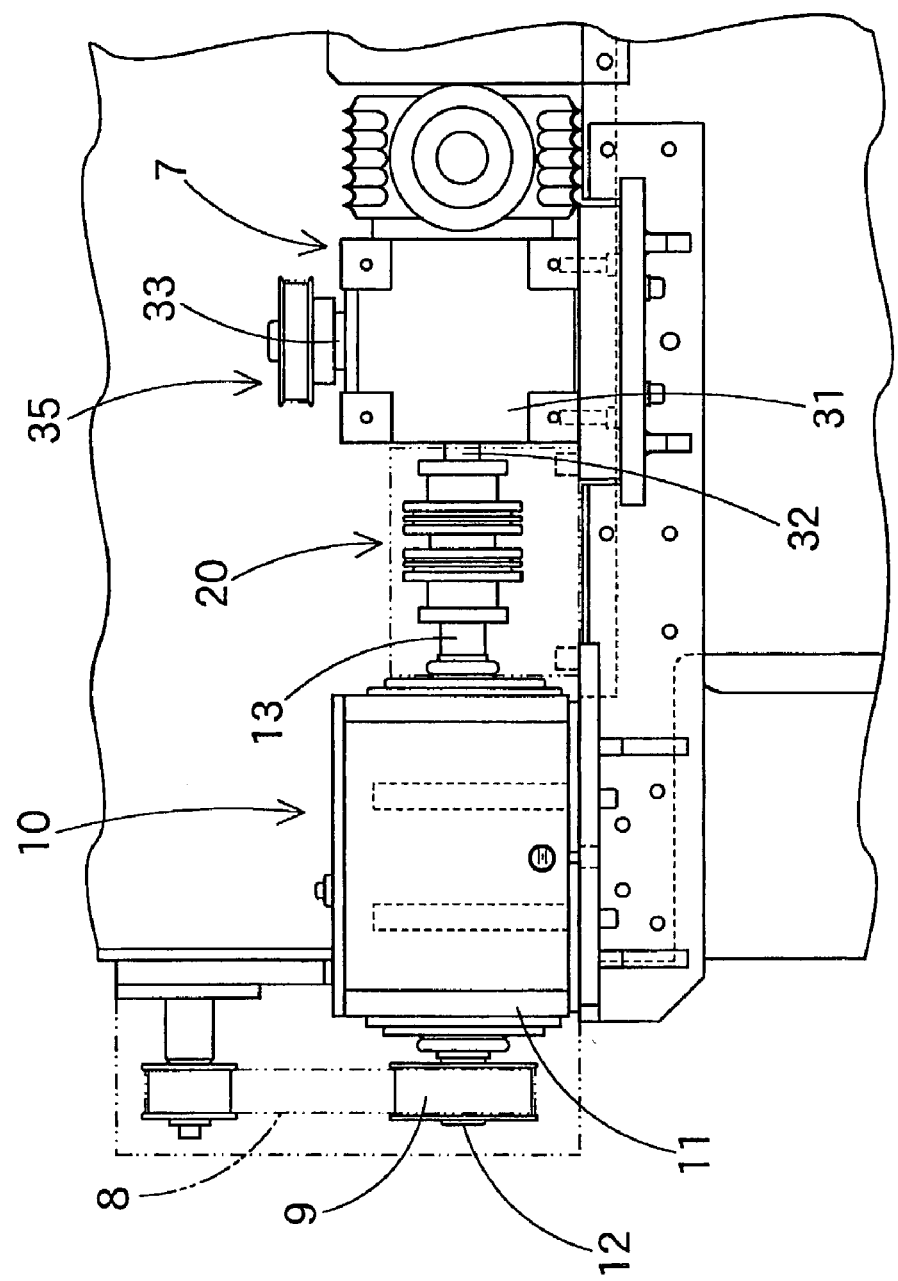
FIG. 2 is a rear view of a press machine, depicting a non-synchronous transmitting apparatus and an angle indexing apparatus shown in FIG. 1.

In FIG. 2, the non-synchronous transmitting apparatus 10 is arranged on a rear portion of the press machine 1 in the following manner. An input shaft 12 is connected via a belt 8 from one end of a driving section (i.e., Crank shaft (not shown)) of the press machine 1, and an output shaft 13 is connected to the angle indexing apparatus 7 arranged on the rear portion of the press machine 1 via a coupling device 20.

Figure 3:
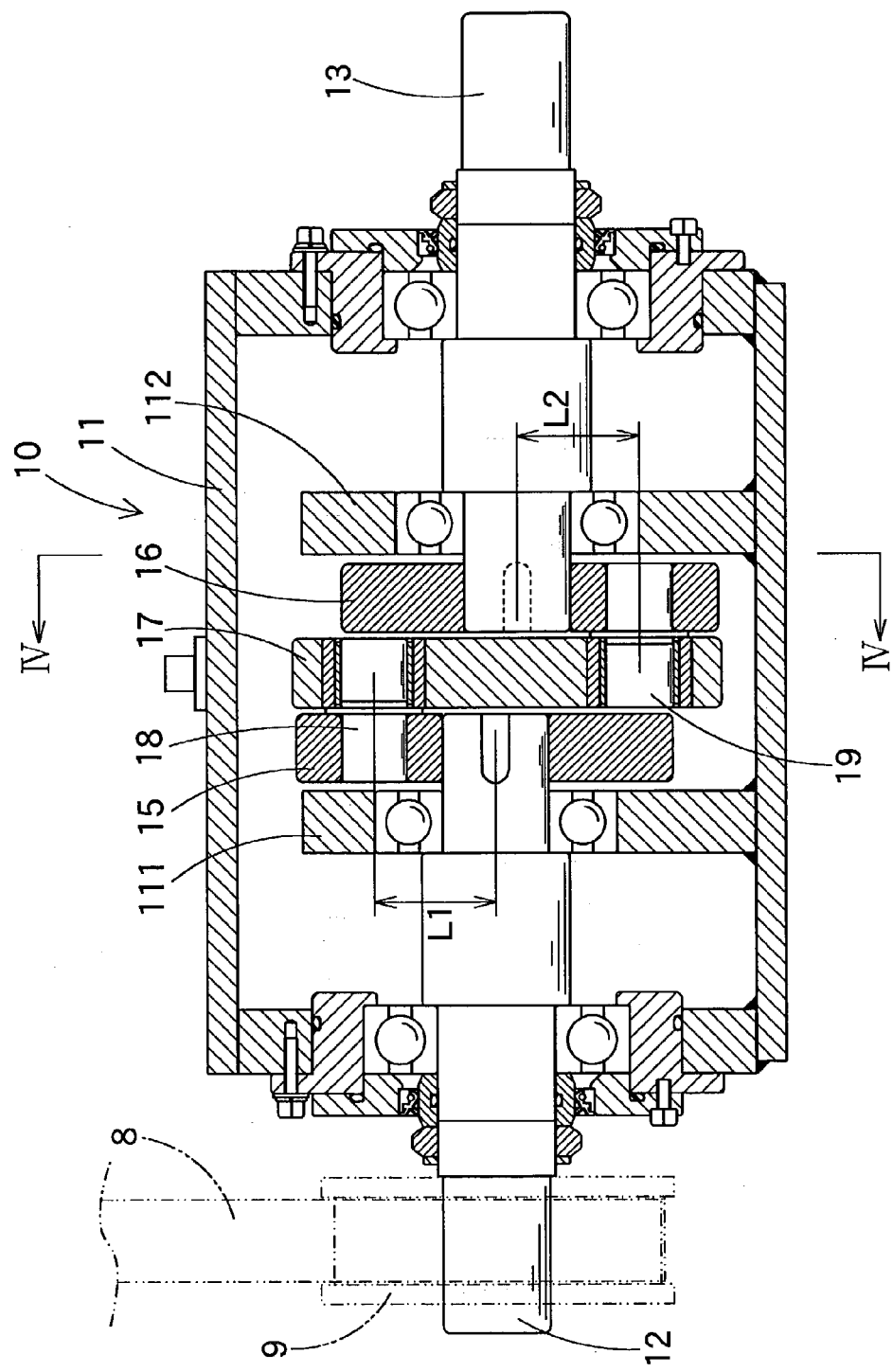
FIG. 3 is a cross-sectional view showing the non-synchronous transmitting apparatus shown in FIG. 2.
Figure 4:
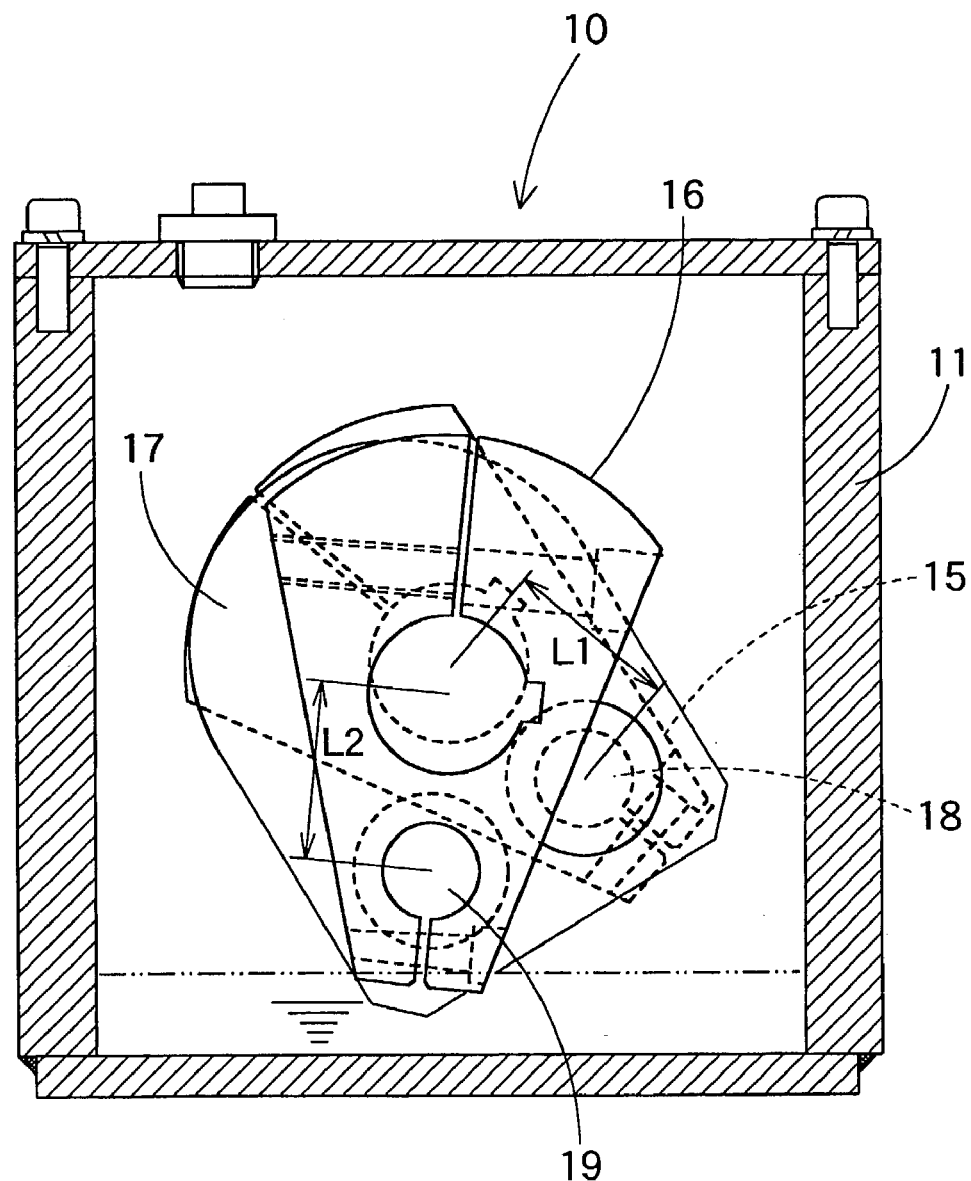
FIG. 4 is a cross-sectional view taken along a line IV—IV of FIG. 3, depicting a non-synchronous transmitting mechanism.

As shown in FIG. 3 and FIG. 4, the non-synchronous transmitting apparatus 10 has a box 11 for housing a non-synchronous transmitting mechanism shown in FIG. 4, an input shaft 12 and an output shaft 13. The input shaft 12 is inserted through the box 11 from one direction to a rotating axis direction, and the output shaft 13 is inserted through the box 11 from another direction to the rotating axis direction. One end of the input shaft 12, a pulley 9 is secured outside the box 11 and the other end of the input shaft 12 portion toward into the box 11 is sustained by a support wall 111 standing from an internal bottom wall of the box 11, a first rotating lever 15 is rotatably attached to the other end of the input shaft 12. The first rotating lever 15 is formed as substantially a sector shape. One end of the output shaft 13 is connected to the coupling device 20 (see FIG. 2) outside the box 11 and the other end of output shaft 12 portion toward into the box 11 is sustained by a support wall 112 standing from an internal bottom wall of the box 11, a second rotating lever 16 is rotatably attached to the other end of the output shaft 13. The first rotating lever 16 is formed as substantially a sector shape. The second rotating lever 16 is attached so as to face the first rotating lever 15 attached to the input shaft 12.

A connecting lever 17 is interposed between the first and second rotating levers 15 and 16. The connecting lever 17 is rotatably connected to the first rotating lever 15 via a first connecting pin 18 arranged at a position eccentric with the input shaft 12 as well as rotatably connected to the second rotating lever 16 via a second connecting pin 19 arranged at a position eccentric with the input shaft 13.

A distance L1 between the rotating axis of the first rotating lever 15 (rotating axis of the input shaft 12) and that of the first connecting pin 18, and a distance L2 between the rotating axis of the first rotating lever 16 (rotating axis of the input shaft 13) and that of the second connecting pin 19, are set in the same. The input shaft 12 and the output shaft 13 are arranged at a position eccentric to the box 11.

Figure 5:
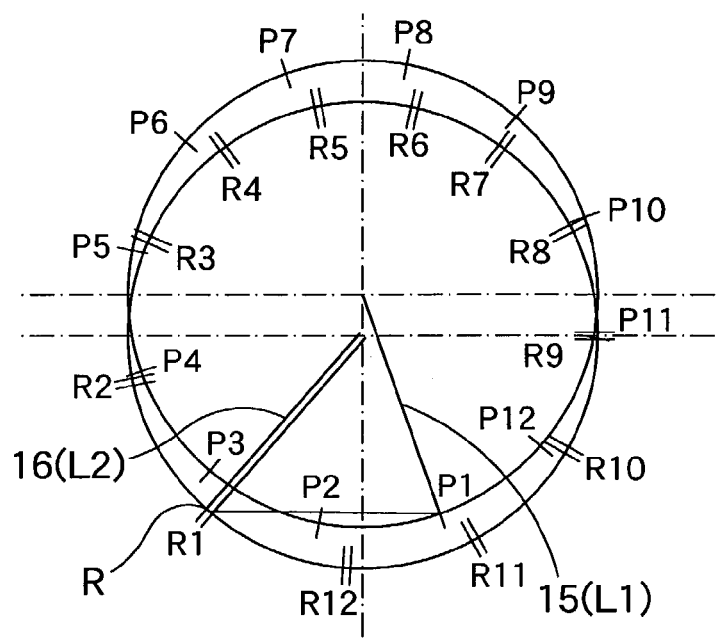
FIG. 5 is a graph showing motion angles of an input and a output shafts of the non-synchronous transmitting.
Figure 6:
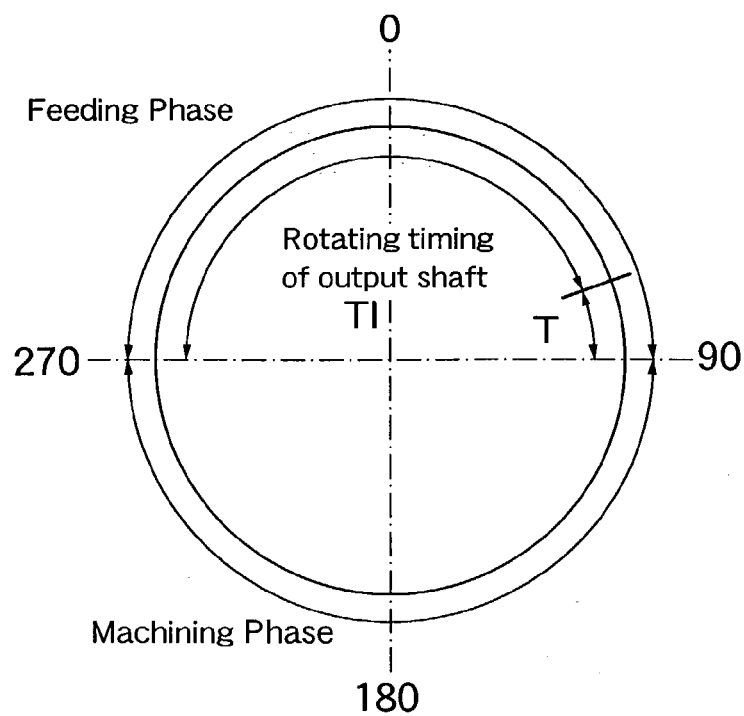
FIG. 6 is a graph showing a Crank Angle of a press machine.

The input shaft 12 is supported to the box 11 mounted with the pulley 9 at its one end and the support wall 111 by a bearing; on the other hand, the output shaft 13 is supported to the main body case 11 and the support wall 112 by a bearing. Whereas, the rotation of the driving section of the press machine 1 is transmitted sequentially to the input shaft 12, the first rotating lever 15, the first connecting pin 18, the connecting lever 17, the second connecting pin 19, the second rotating lever 16 and the output shaft 13. The input shaft 12 and the output shaft 13 are at an eccentric position to the other, and the connecting lever 17 is connected to the first and second rotating levers 15 and 16 at the rotational axis and the eccentric position. Referring to FIG. 5, a revolution of the input shaft 12 at a constant rotating speed is transmitted to the output shaft 13 the revolution at a variable rotational speed, enable connecting lever 17 rotate a faster and a slower rotational speeds to the constant rotational speed of the input shaft 12.

In FIG. 5, the input shaft 12 is driven at the constant rotational speed and a circular locus P of the rotational axis of the first connecting pin 18 is shown with positions (P1, P2, P3 and to P12) with an equal interval of an angle of 30°. The locus P is shown as one end of the distance L1 (a line between the rotational axis of the first rotating lever 15 and the rotational axis of the first connecting pin 18). On the other hand, the output shaft 13 is positioned eccentric to the input shaft 12, a locus R of the rotational axis of the second connecting pin 19 is shown with position (R1, R2, R3 and to R12) with a variable interval of an angle of corresponding to the positions of the rotational axis of the first connecting pin 18 there of. The locus R is shown as one end of the distance L2 (a line between the rotational axis of the second rotating lever 16 and the rotational axis of the second connecting pin 19). Therefore, while the locus P rotates in the constant rotational speed means of with the equal interval, the locus R rotates in the variable rotational speed means of with the variable interval. When the faster rotating speed period (R3, R4, R5 and to R8) is set within the range of Feeding-Phase period of the press machine, the output shaft 13 is in the rotational state period of time of T1, wherein the rotational speed is faster than the input shaft 12 thereof, in the case where the input shaft 12 is rotated within a range of the crank angle of Feeding-Phase period of time (270° to 360° and 0° (360°) to 90°), the Feeding-Phase period of time completes (crank angle of 90°) of the output shaft 13 comes faster than the Feeding-Phase period of time completes (crank angle of 90°) of the input shaft 12 (T1 in FIG. 6). Therefore, the output shaft 13 becomes in a rotation-stopped state (non-rotating period of time T in FIG. 6) until the input shaft 12 reaches to the crank angle of 90°. For an example, when the output shaft 13 rotates by an angle of 150, the output shaft 13 is in the non rotational state during the input shaft 12 is rotating between the Crank Angle of 70° and 90°.

In FIG. 2, the output shaft 13 of the non-synchronous transmitting apparatus 10 is connected to a cam shaft 32 projected from a box 31 of the angle indexing apparatus 7 by a coupling device 20. The rotation of the output shaft 13 of the non-synchronous transmitting apparatus 10 is transmitted to a driving shaft 33 of the angle indexing apparatus 7. The angle indexing apparatus 7 employs known angle indexing mechanism, whereas includes a cam unit having a cam driven by a cam shaft 32, and an indexing unit having an output shaft and a plurality of cam rollers contacted to the cam unit.

Figure 7:
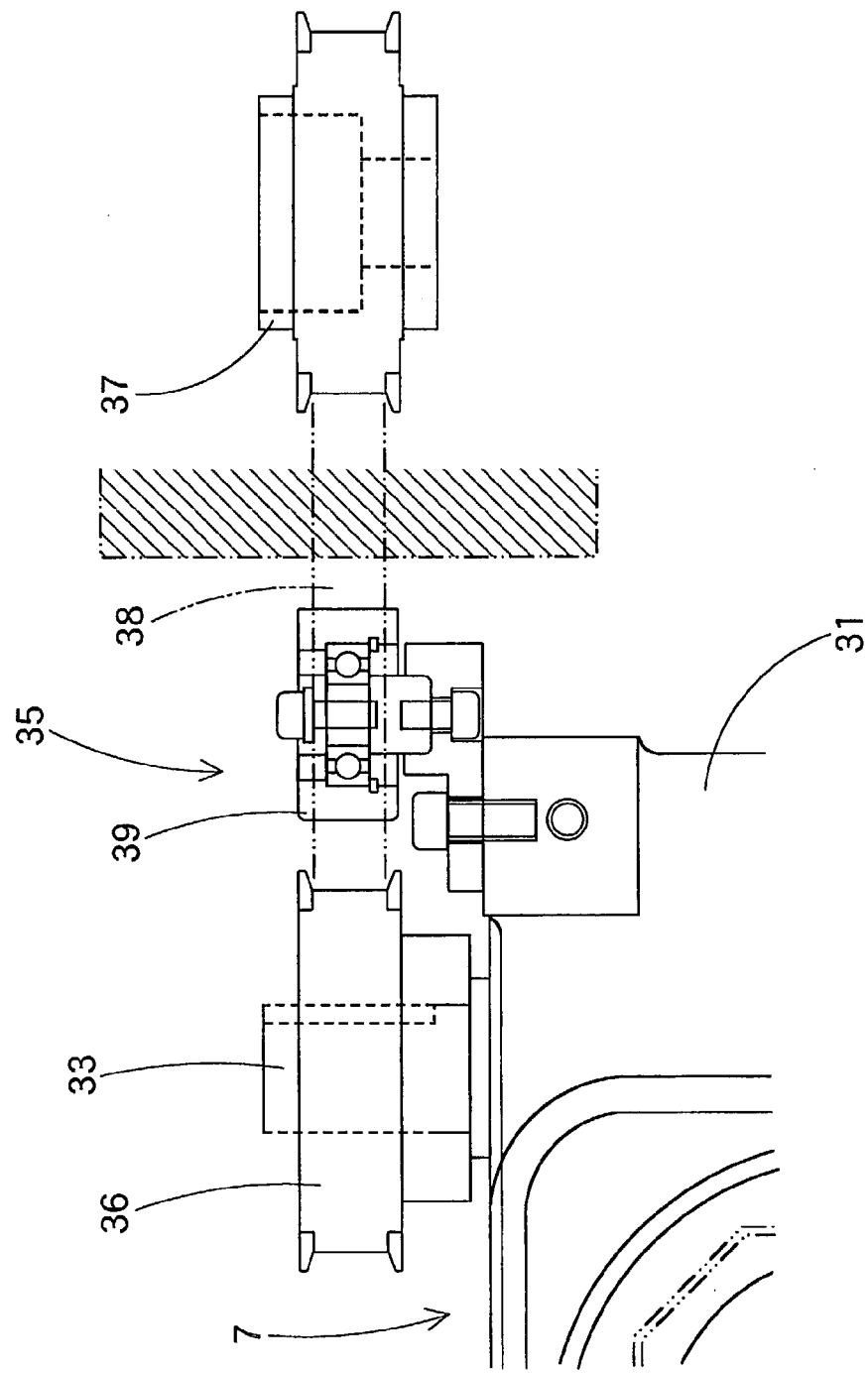
FIG. 7 is a side view showing the angle indexing apparatus shown in FIG. 2.

As shown in FIG. 7, the driving shaft 33 is arranged so as to upwardly project from an upper wall of the box 31, and is connected to a rotatably driving section (not shown) of the stacking cavity device 51 of the press die 5 via a tension unit 35. The tension unit 35 is provided with a pair of tension pulley 39; 39, which connects a pulley 36 mounted to the driving shaft 33 and a pulley 37 mounted to the press die by a belt 38 and applies a tension to the belt 38.

Next, an operation of the assembly apparatus M having the above structure is described below with reference to FIG. 1, FIG. 2, FIG. 3, FIG. 4 and FIG. 5.

When the press machine 1 is operated, the feeder 3 fees the thin-strip material W into the press die 5. In the pres die 5, the thin-strip material W is fed to each cavity so that each process can be carried out. IN this case, in one rotation of the press machine 1, an upper press die is positioned near the Upper Dead Point within a range of the Crank Angle from 270° to 360° and 0° (360°) to 90° (the Feed-Phase period of time) and the feeder 3 feed the thin-strip material W, and in a range of 90° to 180° and 180° to 270° (the Machining-Phase period of time), the upper press die moves down toward a lower press die, and thereafter, each pilot protrusions jump into the pilot guide holes as to carry out process.

On the other hand, in the Feed-Phase period of time, a rotation output is transmitted to the crankshaft of the press machine 1 via the belt 8 and the pulley 9. Then, the input shaft 12 of the non-synchronous transmitting apparatus 10 is continuously rotated at a constant rotational speed as the same rotation of the crank shaft, and thereby, rotates the first rotating lever 15 along the rotating axis of the input shaft 12.

The connecting lever 17 is connected to the first rotating lever 15 via the first connecting pin 18; on the other hand, the second connecting pin 19 is connected to the second rotating lever 16 rotating together with the output shaft 13 positioned eccentrically with the input shaft 12. Thus, as shown in FIG. 5, the constant rotational speed of the input shaft 12 is transmitted and transferred to the variable rotational speed of the output shaft 13. The variable rotation of the output shaft 13 is transmitted to the cam shaft 32 of the angle indexing apparatus 7 by the coupling devise 20 so as to make an intermittent rotation of the driving shaft 33 of the angle indexing apparatus 7. Thereafter, an accelerated speed is transmitted to the sequentially rotating stacking cavity device 51 of the press die 5. In case of the stacking cavity driving device 51 is rotating in a high speed, the stacking cavity device is in the pivoting motion state immediately after the rotating state completion due to an inertia force.

When the output shaft 13 of the non-synchronous transmitting apparatus is driven in variable rotational speed within the Feed-Phase period on time, the rotation of the driving shaft 33 of the angle indexing apparatus 7 complete earlier than the rotation of the input shaft 12 of the non-synchronous transmitting apparatus 10. Thereby the driving shaft 33 is in the non-rotating state between the rotating state completion and Feed-phase period of time completed, means of period of time T. During the time period T, the pivoting motion state of the stacking cavity device is settled its motion and secured in the predetermined position.

When the Machining-Phase period of time start, pilot protrusion arranged in the upper portion of the press die jump into the pilot guide holes, as well as punching out from the thin-strip material and in the stacking cavity device 51, stacking member or stacking core is formed.

According to the assembly method of the embodiment of the invention, the angle indexing apparatus 7 rotates the stacking cavity device in the predetermined angle, and thereafter, the non-rotating period of time T is set until the Feeding-Phase period of time is completed. As a result, the pivoting motion state by the inertia force of the rotation of the stacking cavity device is settled during the non-rotating period of time T, and the predetermined position of the pilot guide holes is secured correctly where the pilot protrusions arranged in the upper portion of the press die jump into. Therefore, it is possible to achieve a high-speed operation.

Further, the driving shaft 33 of the angle indexing apparatus 7 is rotated at the variable rotational speed, and non-rotating period of time top period T is set; therefore, it is possible to maintain high speed operation without reducing the strength of the angle indexing apparatus 7 or without reducing indexing angle of the angle indexing apparatus.

Therefore, according to the stacked core assembly apparatus M of the embodiment of the present invention, in order to secure the non-rotating state period on the put shaft of the angle indexing apparatus, a non-synchronous transmitting apparatus is installed, when the constant rotational speed is transmitted to the input of the non-synchronous transmitting apparatus 10 from the driving unit of the press machine 1. In order for the stacking cavity device to complete the rotation in advance to the Feeding-Phase period of the press machine completes, a non-synchronous transmitting apparatus 10 transform and transmit the output shaft 13 of the non-synchronous apparatus a variable rotational speed. Hence the input shaft 12 of the angle indexing apparatus 7 rotates at variable speed and thus, stacking cavity device rotates in an accelerated manner and its rotating period time is shorter than the Feeding-Phase period of time of the press machine 1. As a result, the angle indexing apparatus 7 has the non-rotation period of time T until the Feeding-Phase period is completed after the rotation of the angle indexing apparatus 7 completes. In the case where each pilot protrusions punch arranged at an upper portion of the press die jump into pilot protrusion guide holes respectably to predetermined guide holes arranged in the stacking cavity device, with no interference and no collision. Therefore, it is possible to achieve a high-speed operation.

In the non-synchronous transmitting apparatus 10, when the input shaft 12 (rotary shaft of the press machine 1 side) is rotated, the rotation output is transmitted to the output shaft (rotary shaft of the angle indexing apparatus side) 13 positioned eccentrically with the input shaft 12 by the connecting lever 17. Therefore, the constant rotation of the input shaft 12 is transmitted as the variable rotation of the output shaft 13. In other words, the angle indexing apparatus 7 connected to the output shaft 12 of the non-synchronous transmitting apparatus 10 has an advanced rotating state with respect to the Feeing-Phase period of the press machine 1. Thus, the non-rotating state period of time is set prior to the Machining-Phase period of the press machine 1 starts, and thereby, pivoting motion of the stacking cavity device is settled prior to the Machining-phase period of time starts. Therefore, the non-rotating period of time T is provided without making small the index angle of the angle indexing apparatus 7, the angle indexing apparatus 7 can be configured without reducing the strength of the angle indexing apparatus itself and is possible a high-speed operation.

The stacked core assembly methods and its apparatus of the present invention are not limited to the above embodiment. For example, the driving shaft may be stopped at a predetermined position using a servo motor in place of the angle indexing apparatus 7. Further, in the case of using the non-synchronous apparatus, a publicly known non-synchronous transmitting apparatus may be employed.

What is claimed is:

1. A stacked core assembly method, which performs stacking in a manner of sequentially rotating a stacking cavity device when assembling a stacked member, the stacked core assembly method comprising the step of:

arranging, in the stacking process, an angle indexing apparatus for intermittently rotating the stacking cavity device and having an angle indexing input shaft and an angle indexing output shaft interconnected to the angle indexing input shaft, a non-synchronous transmitting device having a continuously rotating input shaft and an intermittently rotating output shaft interconnected to the continuously rotating input shaft, the intermittently rotating output shaft being interconnected to the angle indexing input shaft for synchronous intermittent rotation therewith, and a press machine for continuously rotating the continuously rotating input shaft of the non-synchronous indexing apparatus, wherein the intermittently rotating output shaft, the angle indexing input shaft and the angle indexing output shaft intermittently and simultaneously rotate with each other such that the angle indexing output shaft interconnected to the stacking cavity device and the stacking cavity device are in a non-rotating state for a non-rotating period of time after completion of being in a rotating state for a rotating period of time and before completion of a Feeding-Phase period of time, within a predetermined range of the Feeding-Phase period of time.

2. The stacked core assembly method according to claim 1, wherein the non-rotating period of time is set by driving the output driving shaft of the angle indexing apparatus in an accelerated rotational speed during the predetermined Feed-Phase period of time.

* * * * *